(12) United States Patent
Stettner et al.

(10) Patent No.: US 8,949,888 B2
(45) Date of Patent: Feb. 3, 2015

(54) SYSTEMS AND METHODS FOR EFFICIENT MESSAGING AND TARGETED IP MULTICAST ADVERTISEMENT IN COMMUNICATION NETWORKS

(75) Inventors: Armando Paul Stettner, Westford, MA (US); Marcelo D. Lechner, Burlington, MA (US); Michael Patrick Ruffini, Methuen, MA (US); Harpal Singh Bassali, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 496 days.

(21) Appl. No.: 12/345,884

(22) Filed: Dec. 30, 2008

(65) Prior Publication Data
US 2010/0169916 A1 Jul. 1, 2010

(51) Int. Cl.
| | | |
|---|---|---|
| H04N 7/40 | (2006.01) | |
| H04N 7/025 | (2006.01) | |
| H04N 21/81 | (2011.01) | |
| G06Q 30/02 | (2012.01) | |
| H04N 7/16 | (2011.01) | |
| H04N 21/2343 | (2011.01) | |
| H04N 21/258 | (2011.01) | |
| H04N 21/45 | (2011.01) | |
| H04N 21/61 | (2011.01) | |
| H04N 21/6405 | (2011.01) | |
| H04H 60/46 | (2008.01) | |

(52) U.S. Cl.
CPC ............ *H04N 21/812* (2013.01); *G06Q 30/02* (2013.01); *H04N 7/163* (2013.01); *H04N 21/23439* (2013.01); *H04N 21/25891* (2013.01); *H04N 21/4532* (2013.01); *H04N 21/6125* (2013.01); *H04N 21/6405* (2013.01); *H04H 60/46* (2013.01); *H04H 2201/70* (2013.01)
USPC .................. 725/34; 725/32; 725/33; 725/35; 725/36

(58) Field of Classification Search
USPC ..................................... 725/32–36
See application file for complete search history.

(56) References Cited

U.S. PATENT DOCUMENTS

| | | | | |
|---|---|---|---|---|
| 7,100,183 | B2 * | 8/2006 | Kunkel et al. ................... | 725/34 |
| 2002/0049635 | A1 * | 4/2002 | Mai et al. ......................... | 705/14 |
| 2002/0147987 | A1 * | 10/2002 | Reynolds et al. ............. | 725/110 |
| 2005/0204381 | A1 * | 9/2005 | Ludvig et al. .................. | 725/34 |
| 2007/0174125 | A1 * | 7/2007 | Poole et al. ..................... | 705/14 |
| 2009/0069038 | A1 * | 3/2009 | Olague et al. ................. | 455/466 |
| 2009/0106792 | A1 * | 4/2009 | Kan et al. ........................ | 725/34 |

* cited by examiner

*Primary Examiner* — Yassin Alata

(57) ABSTRACT

Systems, apparatus, methods and computer readable mediums for efficient and unconstrained information distribution and IP multicasting are provided. An exemplary method may include receiving, from a set top box, information indicative of criteria associated with targeted advertisement; and determining, at a set top box, whether the criteria corresponds to a characteristic of a household at which the criteria is received. The method may also include joining, from a set top box, a multicast group associated with the criteria in the event the criteria is determined to correspond to the characteristic of the household at which the criteria is received. The method may also include receiving, via multicast, at a set top box, the targeted advertisement associated with the criteria; and displaying, at a video display device, the targeted advertisement. The exemplary method may allow efficient and unconstrained information distribution leading to improved application quality and performance.

25 Claims, 4 Drawing Sheets

SYSTEMS AND METHODS FOR EFFICIENT MESSAGING AND TARGETED IP MULTICAST ADVERTISEMENT IN COMMUNICATION NETWORKS

BACKGROUND INFORMATION

In conventional communication systems, information content such as video streams are transmitted to a set top box (STB) associated with a selected household. The video streams may be transmitted according to packetization defined by the Moving Pictures Experts Group (MPEG) standards. Additionally, messages related to the subject matter of the information content may be embedded in the packet identifier (PIDs) sections of the packets carrying the information content. Accordingly, these messages are transmitted as in-band data within the video streams. As used herein, the term "in-band data" means messages transmitted in packets as part of the information content and during the time period over which the information content is transmitted.

The predominant types of messages provided as in-band data are application-specific data and trigger information. Application-specific data typically includes application data and/or information for controlling the operation of the STB, while trigger information typically includes information regarding the time when the application data and/or the information received at the STB, should be launched. In interactive applications, the in-band data may be textual messages provided to the consumer to control the display of the interactive application. In STB-based advertisement insertions, the in-band data may be textual, audio and/or video advertisements, or commercials. Conventional STBs are limited in that they may receive in-band data only in association with the video stream that is being watched or recorded. Accordingly, the application data and/or information is limited to that which is closely related to the video content, thereby preventing delivery of application-data and/or information that is independent of the subject matter of the video content. Further, the STB cannot request in-band data associated with video streams other than the video streams that are contemporaneously being watched or recorded by the consumer. Finally, a STB may not be able to perform targeted advertisement insertion if the STB tunes to a communication band at a time when an advertisement break is in progress and/or if the advertisement insertion data has been missed.

Other disadvantages to providing messages as in-band data result from the bandwidth-intensive nature of the video content. Because video content is bandwidth-intensive, the bandwidth for in-band data transmission may be severely limited. Accordingly, application information, and corresponding bandwidth-intensive application features (i.e., rich graphics and multimedia content) that can be provided to a consumer, may also be severely limited.

Notwithstanding the aforementioned disadvantages, messages such as targeted advertisements may be distributed to STBs using quadrature amplitude modulation (QAM) channels. The STBs may include a tuner configured to tune to a specific channel when the STB receives instructions for such. However, transmitting targeted advertisements using QAM channels has numerous disadvantages. Dedicated QAM channels are typically employed for delivering targeted advertisements to a STB population. However, there are a finite number of QAM channels and limited bandwidth, for such purposes. For example, if the channels are using QAM256, then each QAM channel will have 38.8 megabits/second (Mbps) of bandwidth. Within this channel, programs are multiplexed into a multi-program transport stream, including different linear broadcast channels. A multiplex can carry up to 10 discrete programs or television streams, for MPEG-2 SD content if each program is 3.75 Mbps. Additionally, HD MPEG-2 programs will require up to 19 Mbps, if there is no rate-limiting protocols applied, and only two streams can be multiplexed. Because of the bandwidth limitations, and the fact that QAM channels are typically dedicated, the number of discrete advertisements that can be distributed to STBs over a selected time interval is small. Accordingly, STB granularity for transmitting targeted advertisements may be poor.

BRIEF DESCRIPTION OF THE DRAWINGS

Purposes and scope of exemplary embodiments described below will be apparent from the following detailed description in conjunction with the appended drawings in which like reference characters are used to indicate like elements, and in which.

DETAILED DESCRIPTION OF EXEMPLARY EMBODIMENTS

Systems, methods and computer readable mediums may include various exemplary embodiments for providing targeted advertisement via multicast to a group meeting selected criteria. The criteria may be associated with a household to which the advertisement is provided, and may include, but is not limited to, the age, gender, marital status, product subscriptions, profession and/or salary of a consumer in the household.

Systems, methods and computer readable mediums may also include various exemplary embodiments for providing messaging associated with video content as in-band data or out-of-band data. The messages may be synchronized with or unrelated to the subject matter of the video content. In some embodiments, the messages are application-specific data or trigger information for the application.

One or more of the embodiments may allow efficient and unconstrained information distribution leading to improved application quality and performance.

The description below describes systems, methods and computer readable mediums. It is noted that the block diagram illustrates various components as separate entities from one another. The illustration of components as separate entities from one another is merely exemplary. The components may be combined, integrated, separated and/or duplicated to support various applications. It is further noted that the software described herein may be tangibly embodied in one or more physical media, such as, but is not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made. Finally, it is noted that although the flow chart provided herein shows a specific order of method steps, it is understood that the order of these steps may differ from what may be depicted. Also two or more steps may be performed concurrently or with partial concurrence. Such variation will depend on the software and/or hardware systems chosen and/or on designer choice. It is understood that all such variations are within the scope of the exemplary embodiments. Likewise, software and/or web implementations of the exemplary embodiments could be accomplished with standard programming techniques with rule based logic and/or other logic to accomplish the various steps.

The description below also describes physical and logical elements of a system, some of which are explicitly shown in figures, others that are not. The inclusion of some physical elements of a system may help illustrate how a given system may be modeled. It should be noted, however, that all illustrations are purely exemplary and the system described herein may include different physical and/or logical elements.

Figure 1:
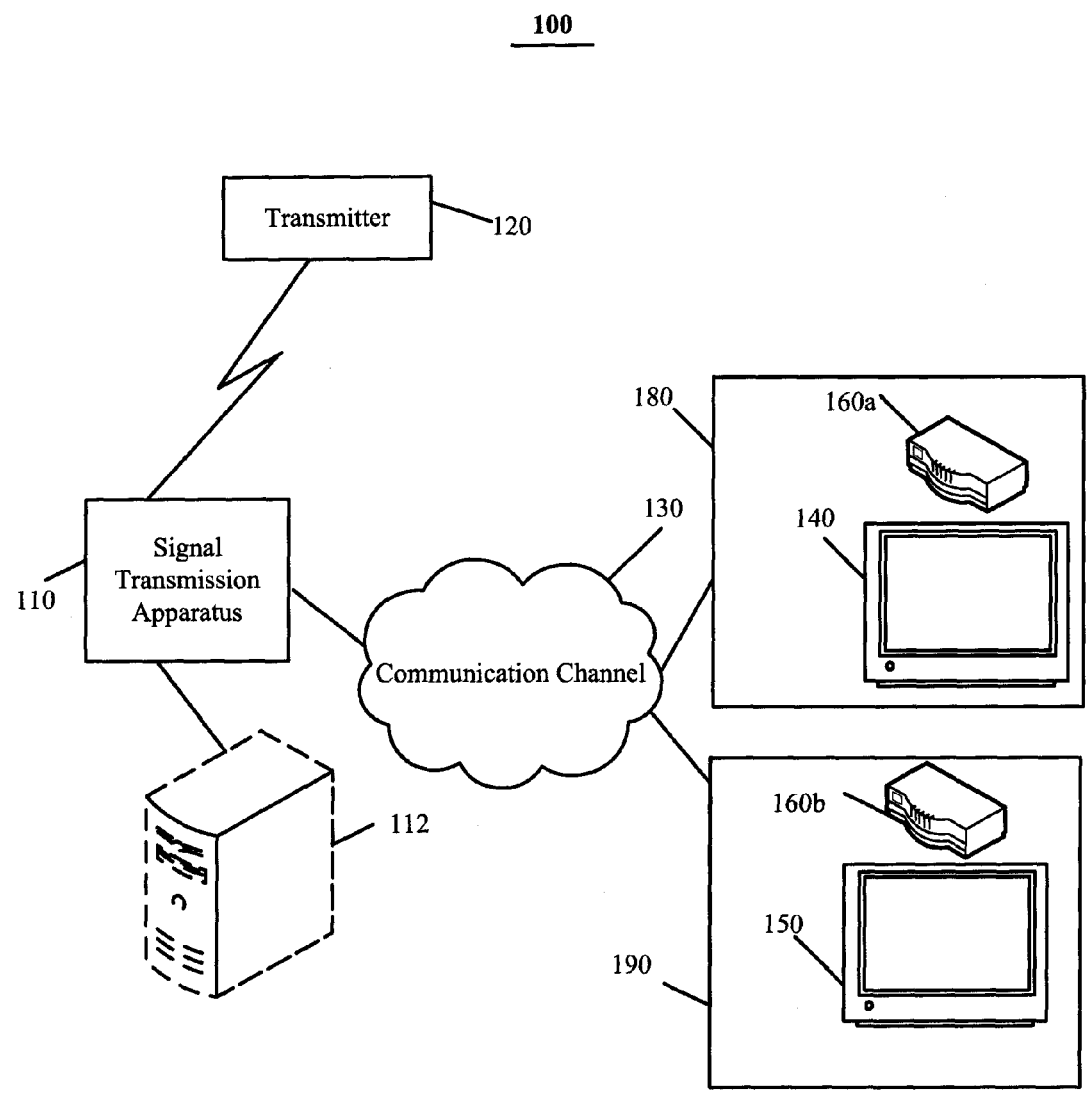
FIG. 1 is a schematic diagram of a system for efficient information distribution in accordance with exemplary embodiments.

For instance, the efficient information distribution system 100 of FIG. 1 illustrates a simplified view of a system and various elements in the system. It is noted that other hardware and software not depicted may be included in the system 100. It is also noted that the system 100 illustrates a signal transmission apparatus 110, a transmitter 120, a communication channel 130, video display devices 140, 150 and STBs 160a, 160b. It will be appreciated that a single instance and/or multiple instances of these elements may be included in the system 100.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., STBs and display devices) separately. The functions described as being performed at various components may be performed at other components, and the various components may be combined and/or separated. Other modifications also may be made.

FIG. 1 is a schematic diagram of a system for efficient information distribution in accordance with exemplary embodiments. The system 100 may include a signal transmission apparatus 110, a transmitter 120, a communication channel 130, video display devices 140, 150 and one or more STBs 160a, 160b. The STBs 160a, 160b may be communicatively coupled to the video display devices 140, 150. The STBs 160a, 160b and video display devices 140, 150 may be located at customer premises sites 180, 190 such as residential households. In some embodiments, the system 100 also includes an advertisement server 112 for providing advertisement to the signal transmission apparatus 110.

In one embodiment, the signal transmission apparatus 110 may be a video head end. The signal transmission apparatus 110 may be communicatively coupled to the transmitter 120, and to the communication channel 130. The communication channel 130 may be communicatively coupled to at least one of the STBs 160a, 160b. The STBs 160a, 160b may be respectively communicatively coupled to the video display devices 140, 150. While the embodiments described include two STBs communicatively coupled to two video display devices, it is understood that the embodiments may be extended to systems, methods and apparatus having only one STB and corresponding video display device as well as a computer, a personal computer, a laptop, a cellular communication device, a workstation, a mobile device, a phone, a handheld PC, a personal digital assistant (PDA), a thin system, a fat system, a network appliance, an Internet browser, a paging device, an alert device, a computer monitor, liquid crystal display (LCD), cathode ray tube (CRT), rear projection television (RPTV), flat panel television, plasma display, surface-conduction electron-emitter display (SED), video projector, light-emitting diode (LED), organic light-emitting diode (OLED) and/or other similar display devices for displaying television and/or video content.

In one embodiment, the transmitter 120 may be any device configured to receive a signal and transmit the received signal to the signal transmission apparatus 110. The signal may be a video signal. The transmitter 120 may be a satellite, a computer, a laptop, motion picture camera, a video repository and/or any other device for transmitting content.

The communication channel 130 may be any type of communication channel configured to transmit and receive video and audio and/or textual information between the signal transmission apparatus 110 and the STBs 160a, 160b. In some embodiments, the video, audio and/or textual information may be an advertisement. The advertisement may be targeted for the household at which the STBs 160a, 160b are located. The advertisement may be targeted based on whether the household meets one or more criteria associated with the advertisement.

In some embodiments, the communication channel 130 may include a plurality of communication bands (not shown) configured to transmit different information in a frequency division multiplexed manner according to any number of suitable multiple access protocols, which are well known. The communication channel 130 may include at least one communication band configured to transmit different information in a time division multiplexed manner according to any number of suitable multiple access protocols, which are well known. The communication channel 130 may be configured to transmit the video and audio and/or textual information according to Internet Protocol (IP) and/or QAM techniques, each of which are well known. The communication channel 130 may be configured to transmit information in-band, out-of-band, and/or by multicast or unicast protocols. Accordingly, the video, audio and/or textual information, including information content, messages and/or advertisements may be transmitted in-band, out-of-band and/or by multicast, unicast and/or broadcast transmission protocols.

In embodiments wherein the communication channel 130 transmits the information according to an IP protocol, the STBs 160a, 160b and/or the respective video display devices 140, 150 may have associated IP destination addresses. The STBs 160a, 160b may also be configured to join a multicast address group to receive and/or transmit information content, including video content. The STBs 160a, 160b may also be configured to join a multicast address group to receive and/or transmit messages and/or advertisements.

Figure 1A:
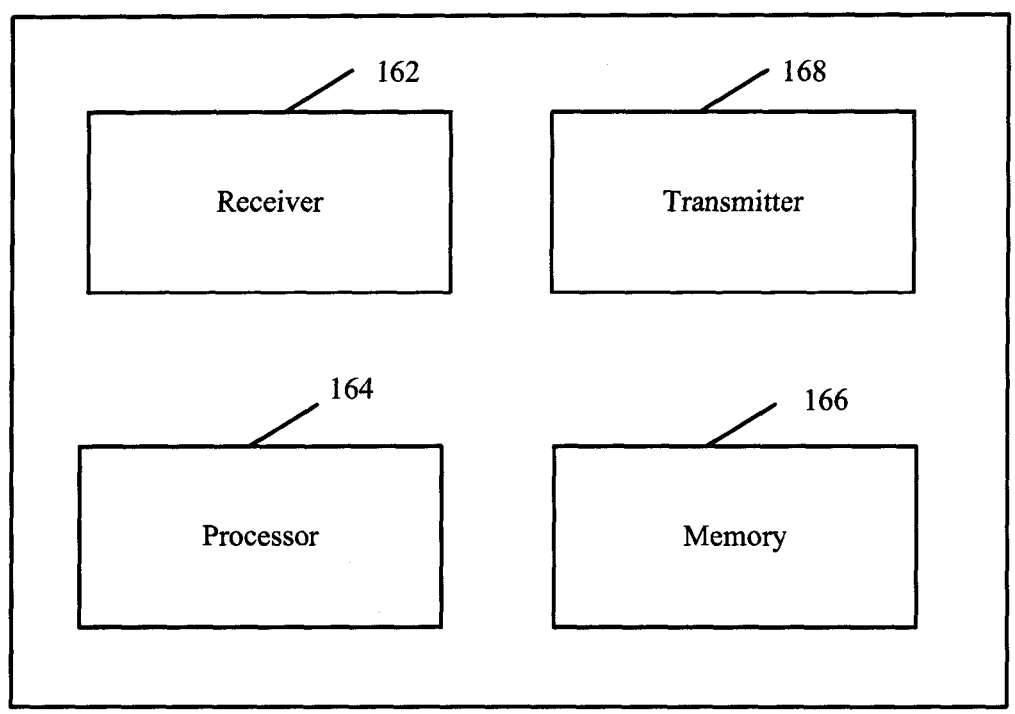
FIG. 1A is a block diagram of a set top box in accordance with exemplary embodiments.

FIG. 1A is a block diagram of a set top box in accordance with exemplary embodiments. Set top box 160 in FIG. 1A illustrates the components of an exemplary, e.g., set top box 160a and/or set top box 160b of FIG. 1. As shown, the set top box 160 may include a receiver 162, a processor 164, a memory 166, and a transmitter 168.

In one embodiment, the receiver 162 and the transmitter 168 may be configured to tune to a frequency associated with a selected communication band and/or to a channel associated with an IP address. For example, the communication band may be the first communication and/or the second communication band of the communication channel 130 for receiving signals as in-band data or as out-of-band data. As another example, the IP address may be a multicast address for receiving information multicast to the channel. The signals received and transmitted by the STBs 160a, 160b may be information content, such as a video signal, messages, application-specific data, trigger data and/or advertisements.

The memory 166 may be any type of physical media capable of storing information including, but not limited to, a hard drive, read only memory (ROM), random access memory (RAM), a compact disc (CD), a digital versatile disc (DVD and/or a floppy disk. The information stored by the memory 166 may include characteristics of a household with which the STBs 160 is associated, advertisements, channel frequency and/or IP channel address information, application-specific data, trigger data and/or information content, such as video signals.

The processor 164 may be any type of processor capable of processing information that may be stored in the memory 166 for performing the functions of the exemplary embodiments. The processor 164 may be configured to perform one or more functions of method 200 and/or method 300.

Additionally, in exemplary embodiments, the STBs 160a, 160b may be any devices able to be communicatively coupled to a communication network 130 to receive information for controlling a video display on the video display device 140, 150. For example, the STBs 160a, 160b may be a satellite dish receiver, a digital video recorder (DVR), a cable box or the like.

In exemplary embodiments, the video display devices 140, 150 may include, but are not limited to, laptops, personal computers, cellphone and/or any other device capable of displaying video. In other embodiments, the video display devices 140, 150 may include, but are not limited to, a computer monitor, liquid crystal display (LCD), cathode ray tube (CRT), rear projection television (RPTV), flat panel television, plasma display, surface-conduction electron-emitter display (SED), video projector, light-emitting diode (LED), organic light-emitting diode (OLED) and/or other similar display devices for displaying television and/or content. Also, the display device 140, 150 may include, but not limited to, a computer, a personal computer, a laptop, a cellular communication device, a workstation, a mobile device, a phone, a handheld PC, a personal digital assistant (PDA), a thin system, a fat system, a network appliance, an Internet browser, a paging device, an alert device, and/or other any other device for displaying television content.

In an exemplary embodiment, the signal transmission apparatus 110 may receive from the transmitter 120, a number of different types of signals including, but not limited to, signals indicative of information content, such as a video signal, application-specific data, trigger information and/or advertisements. The signal transmission apparatus 110 may transmit the signals to the STBs 160a, 160b, over the communication channel 130.

In various exemplary embodiments, the transmission of the application-specific data and/or trigger information may be transmitted independent of the channel over which the video content is delivered. In this case, the transmission may be over a channel that is out-of-band relative to the channel over which the video content is transmitted. Accordingly, the application-specific data and/or the trigger information may be out-of-band data. As used herein, the term "out-of-band data" means messages not transmitted over the band on which in the packet in which the information content is transmitted but over dedicated and separate channels for this purpose. By way of example, but not limitation, application-specific data and/or trigger data may be transmitted as out-of-band data over a first communication band, and the video content that the consumer is watching and/or is being recorded by the STBs 160a, 160b may be transmitted over a second communication band.

Accordingly, application-specific data and/or trigger information typically transmitted as in-band data may be transmitted to a consumer as out-of-band data and may therefore be independent of the subject matter of the video content that the consumer is watching and/or is being recorded by the STBs 160a, 160b. Thus, the subject matter of the application-specific data and/or the trigger information may be expanded beyond subject matter related to mere informational or querying messages for the video content.

Further, the STBs 160a, 160b are not limited to messages synchronized with the video content that the consumer is watching or recording. The STBs 160a, 160b may therefore receive information associated with any video content. Therefore, the likelihood that a STB 160a, 160b will miss the reception of information (i.e., a message) due to a change of band by a consumer is reduced and/or minimized. Specifically, the STBs 160a, 160b may have the capability to maintain state information regarding which channels are currently experiencing a time period corresponding to an advertisement break and/or a time period immediately preceding an advertisement break. The STBs 160a, 160b may therefore be able to perform pre-processing to select targeted advertisements for all of its channels. Accordingly, should a consumer change a the video display device 140, 150 to a channel that is experiencing a time period corresponding to the advertisement break, the STBs 160a, 160b would have necessary information for seamlessly performing an insertion of targeted advertisement for that channel. The seamless insertion may be undetectable by the consumer. Accordingly, the need for repeated transmissions of advertisements and other types of information may be reduced.

Additionally, transmitting application-specific data and/or trigger information as out-of-band data may also allow the STBs 160a, 160b to proactively request specific data and/or services without interfering with the video content, which may be transmitted on a different communication band.

Additionally, the applications may be able to be of higher complexity, may be more bandwidth-intensive and/or substantially any content may be distributed to the consumer at any time independent of the video content being watched or recorded because the application-specific data may be decoupled from the video content. Further, the transmission rate for applications may be increased without affecting the quality of service of the video content.

In various exemplary embodiments, the transmission of the application-specific data and/or trigger information may be synchronized with the video content transmission. In this case, the transmission may be over a channel that is in-band relative to the channel for which the video content is transmitted when the application-specific data. In order to perform such transmission, during a first time interval, the signal transmission apparatus 110 may transmit the video signal to the STBs 160a, 160b over the communication channel 130. Also during the first time interval, the signal transmission apparatus 110 may transmit the application-specific data and/or the trigger information as in-band data in the PID associated with the video content. Accordingly, application-specific data and trigger information closely related to the video content may be transmitted in a manner synchronized with the video content.

The STBs 160a, 160b may convert the received video stream to a signal having a format suitable for receipt by the video display devices 140, 150. The video display devices 140, 150 may display information corresponding to the signal received from the STBs 160a, 160b. In the embodiments disclosed, the consumer may receive information content and/or messages that are either related or unrelated to the subject matter of the information content.

Figure 2:
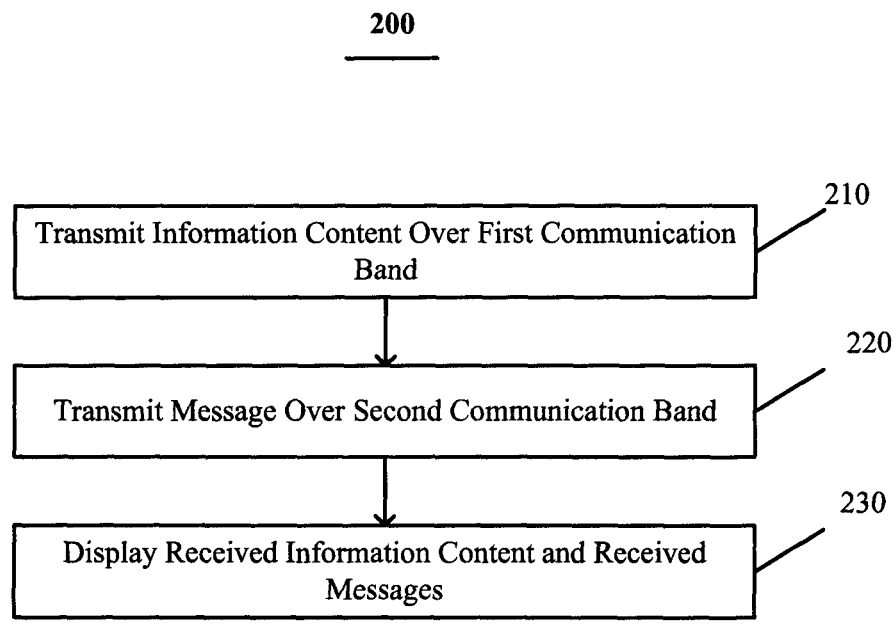
FIG. 2 is a flow chart illustrating a method for efficient messaging in accordance with an exemplary embodiment.

FIG. 2 is a flow chart illustrating a method for efficient messaging in accordance with an exemplary embodiment. It is understood that the method 200 may be extended to the structure of FIG. 1. Further, FIG. 2 represents an exemplary embodiment and is not meant to be limiting. In particular, the method 200 may be executed or otherwise performed by one or a combination of various method steps. The method 200 and/or its steps are not limited to any particular type of structure, whether hardware, software or a combination of hardware and software. With regard to hardware, the method 200 may be performed by analog or digital circuitry such as that found in any number of devices, including, but not limited to, integrated circuits. With regard to software, one or more steps of the method 200 may be performed by a computer-readable medium having an executable computer program for performing the steps of the method 200.

In block 210, information content may be transmitted over a first communication band of the communication channel 130. The information content may be transmitted by the signal transmission apparatus 110. The signal transmission apparatus 110 may be communicatively coupled to the communication channel 130 and configured to provide a transmission over the first communication band of the communication channel 130. The information content may be received from the first communication band by the STBs 160a, 160b.

In block 220, one or more messages may be transmitted over a second communication band of the communication channel 130. The messages may be transmitted by the signal transmission apparatus 110. The signal transmission apparatus 110 may be communicatively coupled to the communication channel 130 and configured to provide a transmission over the second communication band of the communication channel 130. The messages may be received from the second communication band by the STBs 160a, 160b.

In some embodiments, the first communication band may be different from the second communication band. In various embodiments, the one or more messages may be application-specific data and/or trigger information transmitted as out-of-band data. The one or more messages may be unrelated to the subject matter of the information content.

In block 230, the received information content and the received one or more messages may be displayed. The information content and the one or more messages may be received by the STBs 160a, 160b and displayed on the video display devices 140, 150 in some embodiments.

Referring back to the system of FIG. 1, in various embodiments, the signal transmitter apparatus 120 may be configured to access an advertisement server (not shown) configured to provide to the signal transmitter apparatus advertisement associated with selected criteria. The signal transmitter apparatus 120 may then provide the advertisement to the communication channel 130. Additionally, the STBs 160a, 160b may be associated with an IP destination address to which an IP datagram containing information, such as a targeted advertisement, may be routed. In some embodiments, the IP datagram may be a multicast packet including an IP header portion having a message portion and an IP header portion. The IP header portion may include a source field having information indicative of a multicast address associated with and/or recognized by one or more of the STBs 160a, 160b. The IP datagram may be transmitted to the STB 160a, 160b over the communication channel 130.

Figure 3:
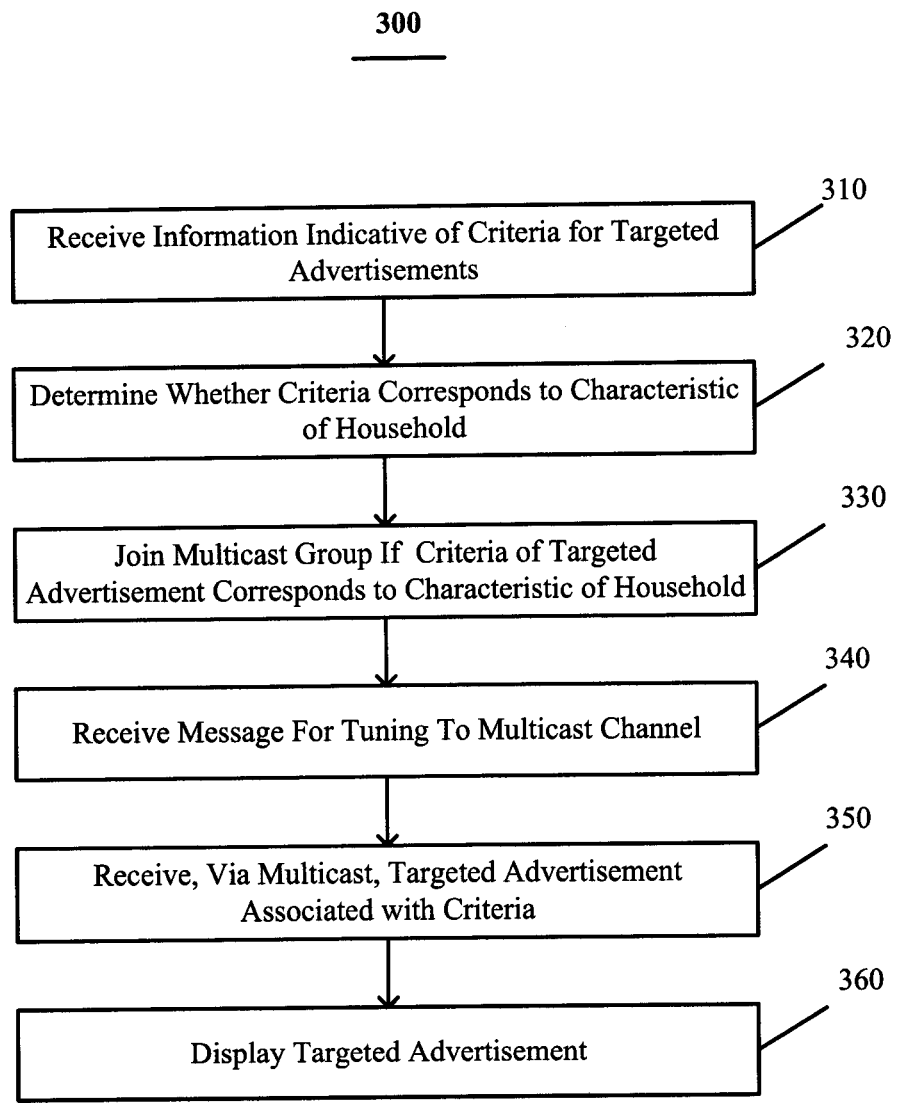
FIG. 3 is a flow chart illustrating a method for efficient IP multicast distribution in accordance with an exemplary embodiment.

This method of transmission of targeted advertisements shall be explained in further detail with reference to FIG. 3. Referring to FIG. 3, a flow chart illustrating a method 300 for efficient IP multicast information distribution in accordance with an exemplary embodiment is shown. It is understood that the method 300 may be extended to the structure of FIGS. 1 and 1A. Further, FIG. 3 represents an exemplary embodiment and is not meant to be limiting. In particular, the method 300 may be executed or otherwise performed by one or a combination of various method steps. The method 300 and/or its steps are not limited to any particular type of structure, whether hardware, software or a combination of hardware and software. With regard to hardware, the method 300 may be performed by analog or digital circuitry such as that found in any number of devices, including, but not limited to, integrated circuits. With regard to software, one or more steps of the method 300 may be performed by a computer-readable medium having an executable computer program for performing the steps of the method 300.

In block 310, information indicative of criteria for a targeted advertisement may be received. In some embodiments, the information may be received from the signal transmission apparatus 110 over the communication channel 130. In various embodiments, the information indicative of the criteria may be stored in memory 166 of the STB 160a, 160b. The information may be retrieved from a memory accessible by the signal transmission apparatus 110 prior to transmitting the information to the STB 160a, 160b.

In various embodiments, the criteria may be related to any number of factors. For example, the criteria may include, but is not limited to, criteria related to the marital status, gender, product subscriptions, zip code, profession and/or salary of the consumer(s). The criteria may also be related to the channel that the consumer is watching. As an example, an STB 160a, 160b in a selected household may be provided certain targeting criteria related to marital status, zip code, channel being watched, annual salary and/or age. In one embodiment, the STB 160a, 160b is provided the criteria by the signal transmission apparatus 110. The criteria mentioned above are merely exemplary and not exhaustive. The criteria may be received as in-band data or out-of-band data relative to the information content (e.g., video signals) that may be received by the STB 160a, 160b. In various embodiments, the criteria may be received by unicast, multicast and/or broadcast transmission protocols. In various embodiments, the STB 160a, 160b may be provided the criteria by any Unix- or PC-based computer system communicatively coupled to the communication channel 130. In various embodiments, the criteria may be stored in memory of any suitable hardware, software and/or combination of hardware and software. By way of example, but not limitation, the memory may be the memory of any Unix- or PC-based computer system, database, server, information repository or the like.

In other embodiments, block 310 may be skipped and the STB 160a, 160b may proactively join a multicast group that may be assigned to carry selected advertisement content meeting the criteria. Proactively joining the multicast group may be performed when the STB 160a, 160b joins a multicast group without receiving information indicative of criteria immediately prior to joining the group. The STB 160a, 160b may be able to proactively join the multicast group because the criteria associated with the multicast group may be already known to the STB 160a, 160b. Accordingly, in the embodiments wherein the STB 160a, 160b proactively joins the multicast group, the amount of the advertisement content that is not received by the STB 160a, 160b due to the STB 160a, 160b joining the group during an inopportune time period may be reduced or eliminated. An inopportune time period may occur when network delays are at a level above a selected threshold that causes the targeted advertisement content to be received too late at the STB 160a, 160b.

Referring back to block 310, in block 320, a determination may be made as to whether the criteria received correspond to a characteristic of a selected household that is associated with an STB 160a, 160b. The processor 164 of the STB 160a, 160b may make such determination upon accessing information indicative of a characteristic of the household and comparing the accessed information to the criteria. In one embodiment, the information indicative of the characteristic of the household is stored in the memory 166.

In block 330, the STB 160a, 160b may join the multicast group associated with a desired one or more multicast channels if the criteria corresponds to a characteristic of the household to which the STB 160a, 160b is associated. In various embodiments, the STB 160a, 160b may proactively join the multicast group as noted above. By way of example, Household A may meet the following criteria: age: 55-65, marital status: married, income: $60,000-$70,000/year, zip code: 01844. Accordingly, household A may join a multicast group that has addressable advertisements transmitted to a plurality of STBs 160a, 160b while it may also join the specific targeted advertisement channels transmitted only via multicast. For example, the STB 160a, 160b in household A may tune to ESPN and at the same time, tune to: Multicast Group A: ESPN_55-65; Multicast Group B: ESPN_married; Multicast Group C: ESPN_$60,000-$70,000/year; and/or Multicast Group D: ESPN_01844. In some embodiments, the STB 160a, 160b may join the multicast group by sending information indicative of a request to join the multicast group. The STB 160a, 160b may send the information from its transmitter 168.

The information may be sent to the signal transmission apparatus 110 and/or the advertisement server 112. In block 340, the STB 160a, 160b may receive a message including an instruction to tune to a channel to receive the advertisement via multicast transmission. The message may be received by the receiver 162 from the signal transmission apparatus 110 and/or the advertisement server 112, and processed by the processor 164 of the STB 160a, 160b. In some embodiments, the message may also be stored in the memory 166 of the STB 160a, 160b. The receiver 162 may tune to a multicast channel associated with the received message to receive targeted advertisements via multicast. The targeted advertisements may meet the criteria received and processed by the processor 162 of the STB 160a, 160b.

In some embodiments, the message may also include other advertisement insertion information. In various embodiments, the advertisement insertion information includes a multicast channel to which the STB 160a, 160b should tune to receive the targeted advertisements via multicast. The messages may be sent in-band data or out-of-band data.

In block 350, the targeted advertisement corresponding to the criteria may be received. The information may be received by the receiver 162 of the STB 160a, 160b on an IP multicast address associated with the STB 160a, 160b. The information may be received upon transmission by the signal transmission apparatus 110 in conjunction with the communication channel 130.

In block 360, the targeted advertisement may be displayed. The targeted advertisement may be displayed on the video display devices 140, 150. The display of the video display devices 140, 150 may be controlled by the STB 160a, 160b.

In this embodiment, targeted advertisements unrelated to the subject matter of the video content may be transmitted to the consumer. The targeted advertisements may be unrelated to the subject matter of the video content because they may be based on a criteria that is related to the characteristic of a household (as opposed to being related to the subject matter of the video content). In other embodiments, the targeted advertisements may be unrelated to the subject matter of the video content and transmitted as out-of-band data.

In the preceding specification, various exemplary embodiments of systems, modules, methods and/or computer readable mediums have been described with reference to the accompanying drawings. It will, however, be evident that various modifications and/or changes may be made thereto, and/or additional embodiments may be implemented, without departing from the broader scope of the invention as set forth in the claims that follow. The specification and/or drawings are accordingly to be regarded in an illustrative rather than restrictive sense.

What may be claimed is:

1. A method comprising:
   receiving, at a set top box, information indicative of criteria associated with a targeted advertisement;
   determining, at the set top box, whether the criteria correspond to a characteristic of a household at which the criteria is received by comparing, at the set top box, the criteria to characteristic information stored on the set top box;
   storing, at the set top box, state information that indicates a plurality of channels that are experiencing an advertisement break, wherein the plurality of channels that are experiencing an advertisement break includes at least one program channel that is not currently being displayed at a video display device;
   in the event the criteria is determined to correspond to the characteristic of the household at which the criteria is received, joining, at the set top box, a multicast group associated with the criteria and with one of the plurality of channels, the joining step comprising the steps of: (1) tuning to the one of the plurality of channels at substantially the same time as joining the multicast group to allow viewing of the targeted advertisement via the multicast group immediately upon tuning to the one of the plurality of channels experiencing the advertisement break, and (2) sending a request from the set top box to join the multicast group, wherein the request is sent after the criteria associated with the targeted information is received;
   receiving, at the set top box, via the multicast group, the targeted advertisement associated with the criteria; and
   displaying, at the video display device, the targeted advertisement on the one of the plurality of channels that are experiencing the advertisement break, based at least in part on the stored state information.

2. The method of claim 1, wherein the criteria comprises at least one of the age, gender, marital status, product subscription, profession, or salary of a consumer associated with the household.

3. The method of claim 1, further comprising receiving, by the set top box, a message comprising an instruction to tune to a channel for receiving the multicast.

4. The method of claim 3, wherein the message is received as in-band data.

5. The method of claim 3, wherein the message is received as out-of-band data.

6. The method of claim 1, wherein the state information further indicates a plurality of channels experiencing a time period immediately preceding an advertisement break.

7. The method of claim 1, further comprising pre-processing, at the set top box, the targeted advertisement based on the stored state information.

8. The method of claim 7, wherein displaying the targeted advertisement on one of the plurality of channels that are experiencing the advertisement break is performed seamlessly based on the pre-processing.

9. The method of claim 4, further comprising receiving video content data comprising one or more packet identifier (PID) sections during a first time interval, wherein the message is received during the first time interval, wherein the message is transmitted as in-band data in the one or more PID sections associated with the video content data.

10. The method of claim 1, further comprising pre-processing, at the set top box, to select a plurality of targeted advertisements before a channel change request by a viewer, the pre-processing enabling the immediate viewing of the targeted advertisement via the multicast group upon tuning to the one of the plurality of channels.

11. A non-transitory computer readable medium having an executable computer program comprising instructions to perform steps of the method of claim 1.

12. An apparatus comprising:
a receiver configured to receive information indicative of criteria associated with a targeted advertisement;
a processor configured to: determine whether the criteria correspond to a characteristic of a household at which the criteria is received by comparing, at the apparatus, the criteria to characteristic information stored on the apparatus, and determine whether to join a multicast group associated with the criteria, wherein the request is sent after the criteria associated with the targeted information is received;
a memory configured to store state information that indicates a plurality of channels that are experiencing an advertisement break, wherein the plurality of channels that are experiencing an advertisement break includes at least one program channel that is not currently being displayed at a video display device;
a transmitter configured to transmit a signal for joining the multicast group at substantially the same time as tuning to one of the at least one plurality of channels to allow viewing of the targeted advertisement via the multicast group immediately upon tuning to the one of the plurality of channels experiencing the advertisement break, the multicast group associated with the criteria and with the one of the plurality of channels, the transmitter configured to transmit the signal in the event the criteria is determined to correspond to the characteristic of the household at which the criteria is received, the receiver also being configured to receive via the multicast group, the targeted advertisement associated with the criteria, and the processor also being configured to output information for causing a display of the targeted advertisement on one of the plurality of channels that are experiencing the advertisement break, based at least in part on the stored state information.

13. The apparatus of claim 12, wherein the criteria comprises at least one of the age, gender, marital status, product subscription, profession, or salary of a consumer associated with the household.

14. The apparatus of claim 12, wherein the receiver is configured receive a message comprising an instruction to tune to a channel for receiving the multicast.

15. The apparatus of claim 14, wherein the message is received as in-band data.

16. The apparatus of claim 14, wherein the message is received as out-of-band data.

17. A method comprising:
receiving, from a signal transmission apparatus, information content over a first communication band of a communication channel at a set top box;
receiving, from the signal transmission apparatus, one or more messages over a second communication band of a communication channel, the first communication band being different from the second communication band at the set top box;
determining whether to join a multicast group associated with the messages by comparing, at the set top box, information associated with the messages to characteristic information stored on the set top box to allow viewing of the one or more messages via the multicast group immediately upon tuning to one of a plurality of channels experiencing an advertisement break, wherein the determination on whether to join the multicast group is made after the messages are received;
storing, at the set top box, state information that indicates which of the plurality of channels are experiencing an advertisement break, wherein the plurality of channels that are experiencing an advertisement break includes at least one program channel that is not currently being displayed at a video display device; and
displaying, at the video display device, the received information content and the received one or more messages on one of the plurality of channels that are experiencing the advertisement break, based at least in part on the stored state information.

18. The method of claim 17, wherein the one or more messages is application-specific data transmitted as in-band data.

19. The method of claim 17, wherein the one or more messages is application-specific data transmitted as out-of-band data.

20. The method of claim 17, wherein the one or more messages is unrelated to the subject matter of the information content.

21. The method of claim 17, wherein the one or messages comprises trigger information.

22. An apparatus comprising:
a receiver configured to receive information content over a first communication band of a communication channel and one or more messages over a second communication band of a communication channel, the first communication band being different from the second communication band;
a memory configured to store state information that indicates a plurality of program channels that are experiencing an advertisement break, wherein the plurality of program channels that are experiencing an advertisement break includes at least one program channel that is not currently being displayed at a video display device;
a processor for determining whether to join a multicast group associated with the messages by comparing, at the apparatus, information associated with the messages to characteristic information stored on the apparatus, wherein the determination on whether to join a multicast group is made after the messages are received;
a transmitter for sending requests to join a multicast group associated with the information content at substantially the same time as tuning to one of the plurality program channels to allow viewing of the one or more messages via the multicast group immediately upon tuning to the one of the plurality of program channels experiencing the advertisement break;

a processor configured to output information for causing a display of the received information content and the one or more messages on one of the plurality of channels that are experiencing the advertisement break, based at least in part on the stored state information.

23. The apparatus of claim 22, wherein the one or more messages is application-specific data transmitted as in-band data.

24. The apparatus of claim 22, wherein the one or more messages is application-specific data transmitted as out-of-band data.

25. The apparatus of claim 22, wherein the one or more messages is unrelated to the subject matter of the information content.

\* \* \* \* \*